(12) United States Patent
Engman

(10) Patent No.: US 12,020,435 B1
(45) Date of Patent: Jun. 25, 2024

(54) DIGITAL IMAGE-BASED MEASUREMENT AND ANALYSIS TOOLS AND METHODS FOR AGRICULTURE

(71) Applicant: Crop Search LLC, Vermilion, OH (US)

(72) Inventor: Eric Engman, Cedarburg, WI (US)

(73) Assignee: Crop Search LLC, Vermilion, OH (US)

( * ) Notice: Subject to any disclaimer, the term of this patent is extended or adjusted under 35 U.S.C. 154(b) by 415 days.

(21) Appl. No.: 17/398,184

(22) Filed: Aug. 10, 2021

Related U.S. Application Data

(60) Provisional application No. 63/064,859, filed on Aug. 12, 2020.

(51) Int. Cl.
*G06T 7/11* (2017.01)
*G06T 1/00* (2006.01)

(52) U.S. Cl.
CPC .............. *G06T 7/11* (2017.01); *G06T 1/0007* (2013.01); *G06T 2207/30188* (2013.01)

(58) Field of Classification Search
CPC . G06T 2207/10068; G06T 2207/10132; G06T 2207/30096; G06T 2207/30101; G06T 7/0012
See application file for complete search history.

(56) References Cited

U.S. PATENT DOCUMENTS

| | | | |
|---|---|---|---|
| 6,154,560 A * | 11/2000 | Cothren | G06T 7/0012 382/128 |
| 8,670,060 B2 | 3/2014 | Jones et al. | |
| 9,182,816 B2 | 11/2015 | Kasahara et al. | |
| 9,696,897 B2 | 7/2017 | Garcia | |
| 10,571,263 B2 | 2/2020 | Abovitz | |
| 2013/0182002 A1* | 7/2013 | Macciola | G06V 10/25 345/589 |

* cited by examiner

*Primary Examiner* — Manuchehr Rahmjoo
(74) *Attorney, Agent, or Firm* — Robert P. Nupp

(57) ABSTRACT

Disclosed herein are systems, methods, and non-transitory computer-readable storage media that allow a user to easily obtain accurate image-based measurements of physical items, including one or more crops. Also disclosed herein are systems, methods and non-transitory computer-readable storage media that utilize the accurate measurements to generate one or more derived metric.

17 Claims, 12 Drawing Sheets

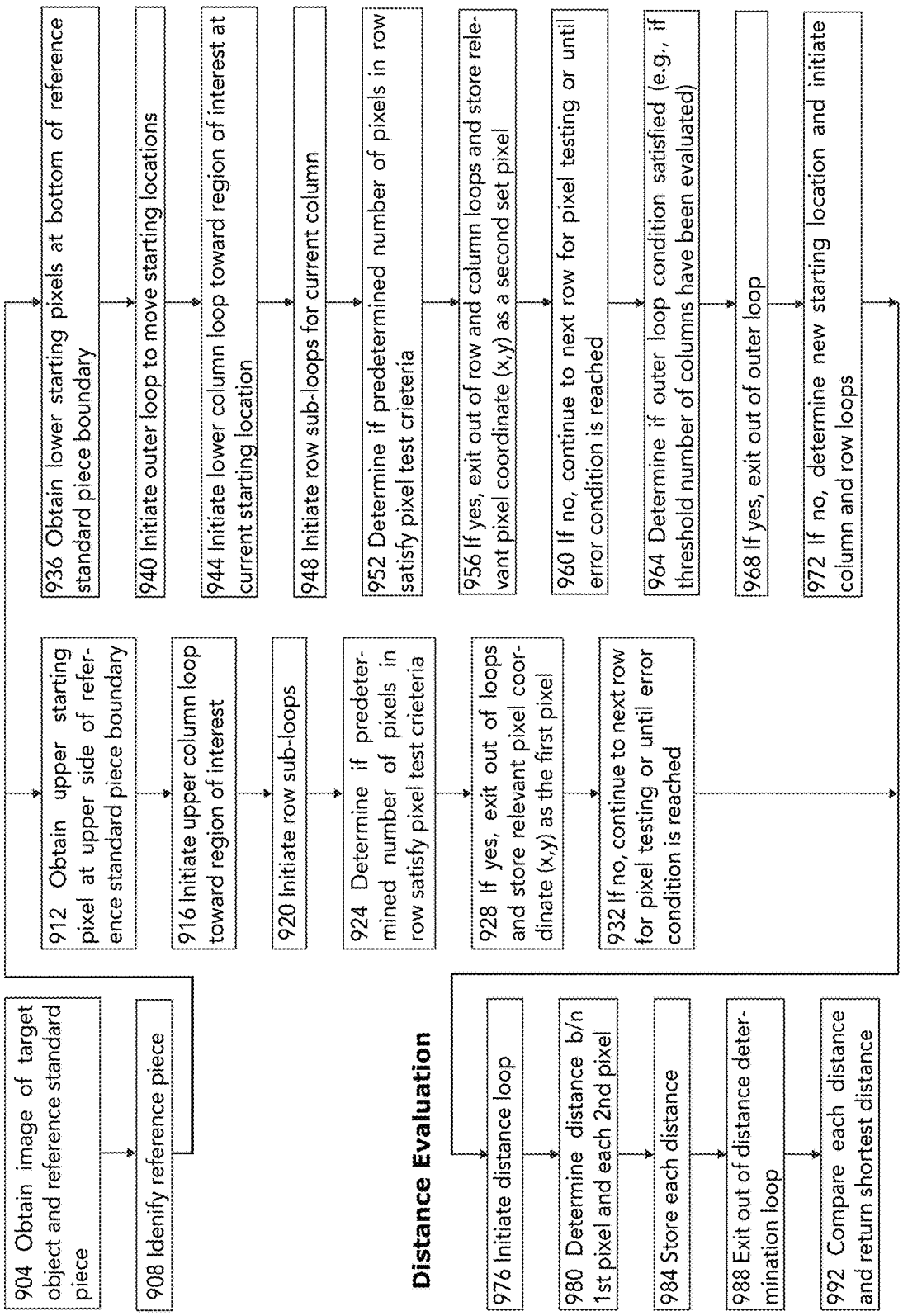

DIGITAL IMAGE-BASED MEASUREMENT AND ANALYSIS TOOLS AND METHODS FOR AGRICULTURE

CLAIM OF PRIORITY AND CROSS REFERENCE

This application claims benefit of priority under 35 U.S.C. § 119(e) to U.S. Provisional Application No. 63/064,859, filed on Aug. 12, 2020, the entire contents and disclosures of which are incorporated herein by reference.

TECHNICAL FIELD

The present disclosure relates to digital image-based measurement tools and methods of obtaining digital image-based measurements, especially for use in the field of agriculture.

BACKGROUND

Image based measurement systems and methods have proven useful in different fields ranging from geospatial imagery to microscopy. In many cases, the systems and methods are complex and involve highly specialized hardware and tools.

On the other end of the spectrum, in systems that have less complex or less specialized hardware and tools, such as off the shelf items (e.g., iPhones®) that are modified or configured to provide image based measurement systems and tools, the lack of cost or complexity results in less-than-needed accuracy and precision in measurements. For example, calibration of these systems may be insufficient to result in precise and accurate measurements.

In addition, certain fields, such as precision agriculture, involve highly specialized subject matter and needs, which can present problems when attempting to provide systems and methods for image based measurement and analyses that are less complex and that are easy to use.

For at least the foregoing reasons, there is a need in the marketplace for image based measurement and analysis systems and methods that are relatively easy to use and that have needed precision and accuracy. In particular, there is such a need in specialized fields such as precision agriculture.

BRIEF DESCRIPTION OF THE DRAWINGS

The present disclosure, in accordance with one or more various embodiments, is described in detail with reference to the following drawings. The drawings are provided for purpose of illustration only and merely depict aspects of typical or example embodiments. These drawings are provided to facilitate the reader's understanding of the disclosure and shall not be considered limiting of the breadth, scope, or applicability of the disclosure.

The components in the drawing are not necessarily drawn to scale. In the drawings, like reference numerals designate corresponding parts throughout the several views. One of ordinary skill in the art will appreciate that a component may be designed as multiple components or that multiple components may be designed as a single component.

FIG. 9 is a flowchart illustrating a general method for calculating pixel scale according to various embodiments of the present disclosure.

DETAILED DESCRIPTION

Figure 1B:
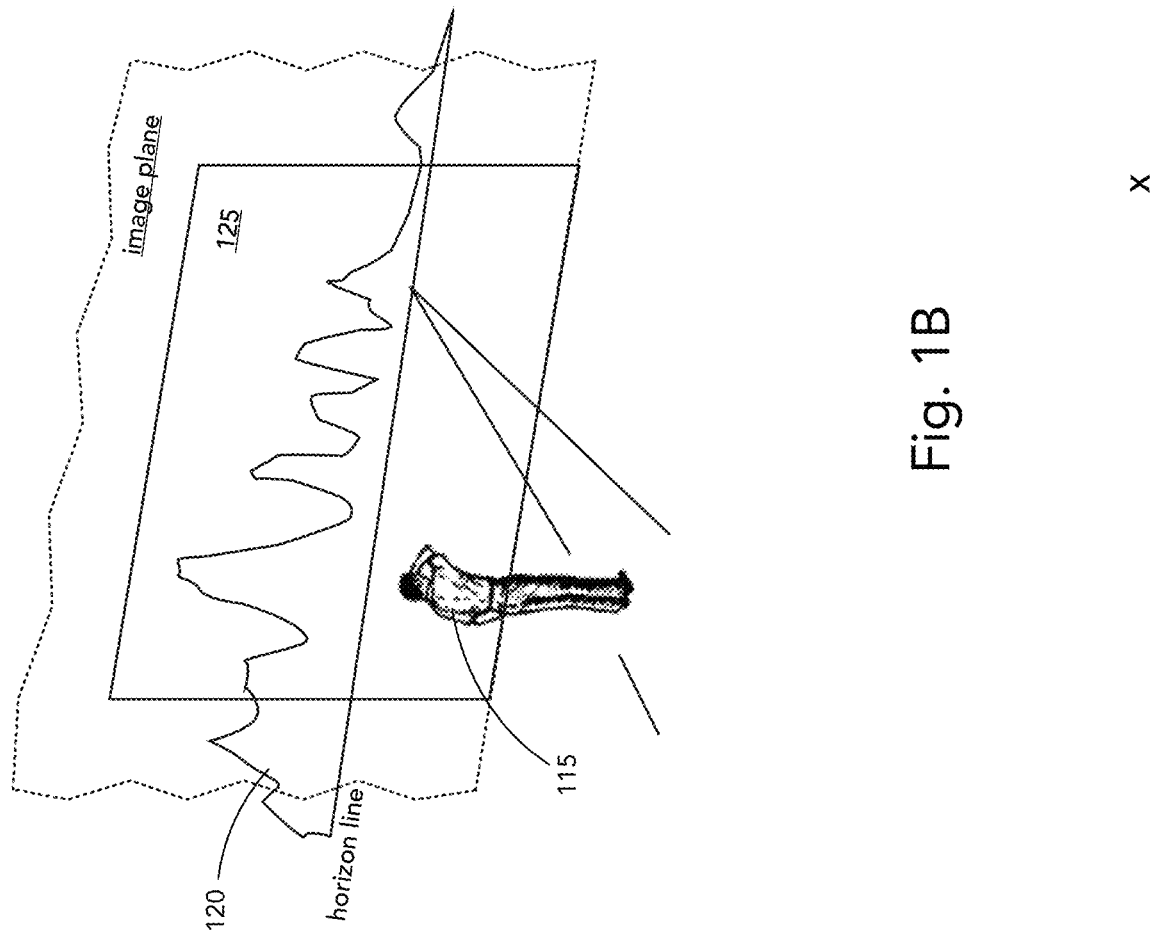
FIG. 1 is a line drawing showing perspective views of a default coordinate system used in various embodiments of the present disclosure.

The present disclosure describes and illustrates one or more novel embodiments of digital image-based measurement systems and methods. In particular, preferred embodiments of such systems and methods may be used in relation to measuring and/or analyzing crops or other agriculture-related subject matter. It should be understood that aspects, features or functions that are described in relation to an embodiment are not necessarily limited to the embodiment described, but rather may be applicable to one or more embodiments, unless expressly described otherwise. Also, the description set forth herein is not to be construed as limited to the embodiments shown. Rather, it is appreciated that various modifications may occur to those skilled in the art that, while not specifically set forth herein, are nevertheless within the spirit and scope of the description. When an embodiment is described as "exemplary", "particularly," or the like, herein, it is to be understood as one non-limiting example embodiment, and does not preclude other embodiments that may not include the limitations described in the exemplary embodiment.

As may be appreciated by one of skill in the art, aspects of the embodiments described herein may be employed as a system, method or computer program product. Accordingly, aspects may take the form of a hardware embodiment, a software embodiment (including firmware, etc.) or an embodiment combining hardware and software that may each generally be referred to herein as a "module," "component," or "system."

Aspects of the present embodiments described herein may take the form of a computer program product embodied in one or more computer readable medium(s) having computer readable program code represented thereon. Further, the systems and methods described herein may be applied as standalone systems or methods, or as part of an integrated package, such as a farm or field management package or application.

As also may be appreciated by one of skill in the art, aspects of the embodiments described herein as functions, routines, algorithms or methods may be implemented in software, which software may comprise computer executable code/instructions stored on computer readable media. Multiple functions may be performed in one or more modules as desired, and the embodiments described are merely examples. The software may be executed on one or more DSP, CPU, GPU, ASIC, FPGA, SoC, microprocessors, or other type of processors operating on one or more computer systems or processor environments, such as a personal computer, server, PaaS, or other computing system.

When dealing with software embodiments, the embodiments are not dependent on any particular software language or type of language, unless context suggests otherwise, and in general any suitable programming language may be employed. When dealing with APIs or similar software constructs, modules may be described abstractly using functional language or using pseudocode or other high level description. Modules generally each contain one or more routines that may or may not be separately described. In object-oriented languages like Python, Java or C++, a class may typically correspond to a module, while a method may typically correspond to a routine. In procedural languages, such as C, functions, subroutines, or procedures may typically correspond to routines, while collections of routines that handle related data may typically correspond to modules. Modules may be expressed explicitly in some languages, implicitly in others (e.g., as a file), while in other languages there may be no corresponding construct, but instead a module may be regarded as simply a grouping of routines.

In general, image-based measurement is a type of photogrammetry that measures one or more dimensions (e.g., length, width, height, area) of physical objects or spaces utilizing one or more 2D images of the physical objects or spaces. Generally, measurements are obtained of the dimension of interest (the "target" dimension) by measuring the corresponding dimension in the image and applying a conversion factor. In one or more embodiments, the conversion factor is a simple ratio (a scaling ratio) correlating a number of pixels in the image with a length of measure or area in physical space. In other embodiments, the conversion factor is a simple ratio correlating a length of measure or area in the image with a length of measure or area in physical space. Unless context suggests otherwise, as used herein, the scaling ratio shall be understood to be a ratio correlating image pixel count to a physical length of measure. As may be appreciated, the accuracy and precision of the image-base measurement is materially related to the accuracy and precision of the scaling ratio.

Figure 1A:
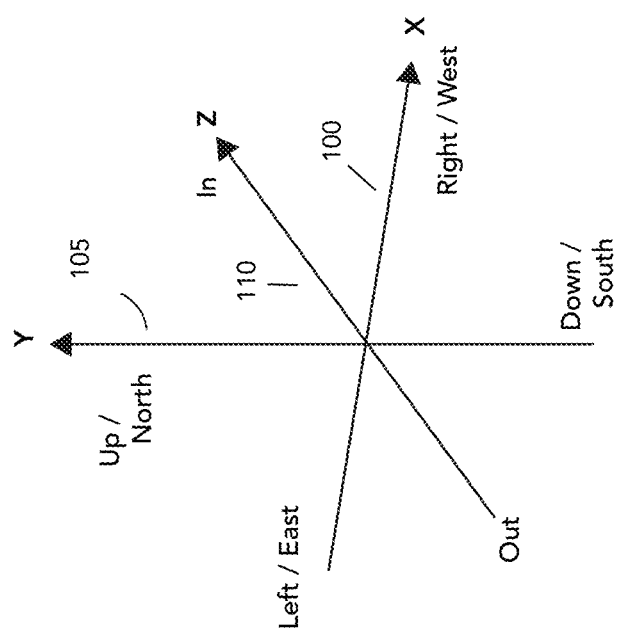

Unless context suggests otherwise, the coordinate system shown in FIG. 1 applies to the following description of the systems and methods disclosed herein. With reference to FIG. 1A, the coordinate system is a Cartesian system (x,y, and z dimensions), wherein the x-axis 100 is arranged from left to right across the page, the y-axis 105 is arranged from bottom to top of the page, and the z-axis 110 is arranged from the viewer's perspective into the page. Each axis is orthogonal to the other axes. With reference to FIG. 1B, unless context suggests otherwise, an image plane referenced herein is arranged to be a plane parallel to the x and y-axes and situated between a viewer 115 (e.g., the person taking the images referenced herein) and the scene 120 (the 3D physical space and objects in that space that are within the viewer's field of view). Perspective image 125 (e.g., the image taken by viewer 115 with a digital device) lies in the image plane. It should be noted that the image plane and axes may be considered to rotate in some of the descriptions of the embodiments herein, such as when the viewer is looking in a direction of view that is angled in relation to the direction of view depicted in FIG. 1, and the coordinate axes should be considered to rotate appropriately. For example, when a viewer is obtaining an image and the direction of view is at an approximately 60 degree angle from the ground plane (i.e., when the direction of view is toward the ground, such as when a viewer is looking at a crop in a field), the coordinate axis and image plane should be considered to rotate accordingly. In such instances, the horizon line would be considered to be in line with the top of the perspective image 125. Alternatively, or additionally, the image plane may simply be considered to be orthogonal to the direction of view.

Figure 2A:
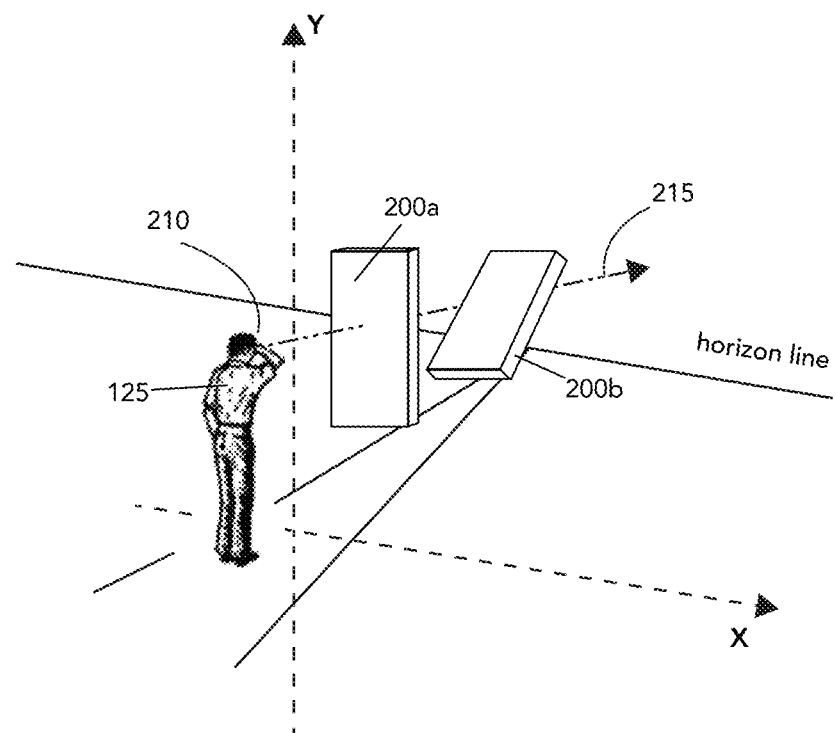
FIG. 2A is a line drawing showing a perspective view of an illustration of foreshortening.

Generally, image-based measurement methods and systems need to account for certain perspective distortions in order to render reasonably accurate measurements. FIG. 2 illustrates one such effect, rotation foreshortening. Rotation foreshortening occurs when an object (e.g., object 200) is rotated so that it is no longer parallel with the image plane. For example, keeping constant the same direction of view 215 (the central axis of a view cone 205 centered on viewpoint 210) and viewpoint 210, a rotational foreshortening may be observed in object 200 when it is rotated about an axis parallel with the x axis, such that a portion of object 200 is closer to the image plane and a portion of object 200 is farther from the image plane, thereby implicating recession effects of vanishing point perspective. Note that a person of ordinary skill will understand the effects of perspective imagery.

Figure 2B:
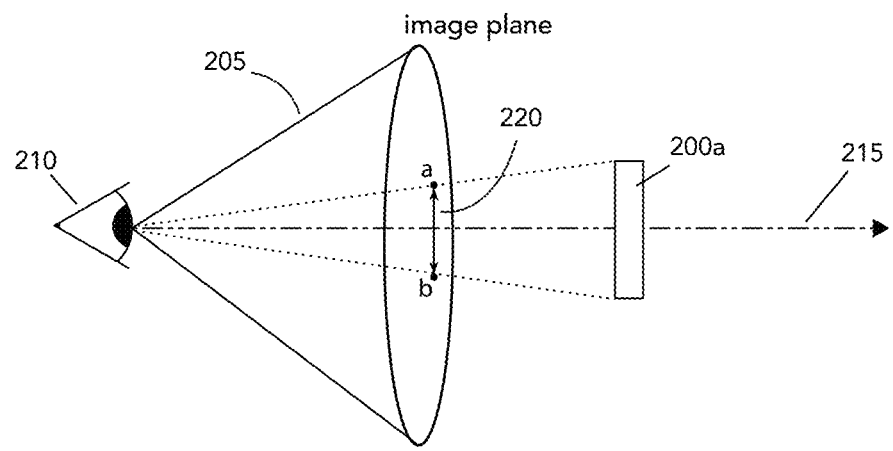
FIGS. 2B&2C are line drawings showing side elevational views of an illustration of foreshortening.
Figure 2C:
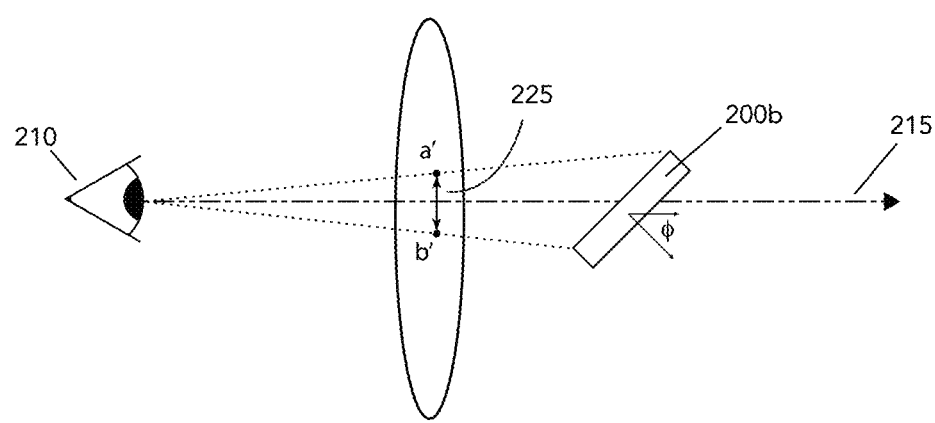

Continuing with reference to FIG. 2, object 200 is illustrated in two positions relative to direction of view 215 and the related image plane—first position 200a and second position 200b. As may be seen, first position 200a is parallel to the image plane and second position 200b is rotated along the direction of view about an axis parallel with the x-axis, such that it lies at an angle φ (e.g., approximately 45 degrees) in relation to the image plane. As illustrated in FIG. 2B, rays from the top and bottom edges of object 200 pass through the image plane at points "a" and "b" for object 200 at position 200a and "a'" and "b'" for object 200 in position 200b. Points a and b define a length dimension 220 in the image plane, whereas points a' and b' define a length dimension 225 in the image plane. As may be seen, image dimension 225 (the apparent length of 200 oriented as in position 200b) is shorter than image dimension 220 (the apparent length of 200 oriented as in position 200a), even though the object depicted in the image is the same physical object (i.e., object 200). Note that as used herein, the terms "apparent length", "apparent height", "apparent width", and the like, refer to the length, height, width, etc., of an object in an image (i.e., on the image plane).

Figure 3A:
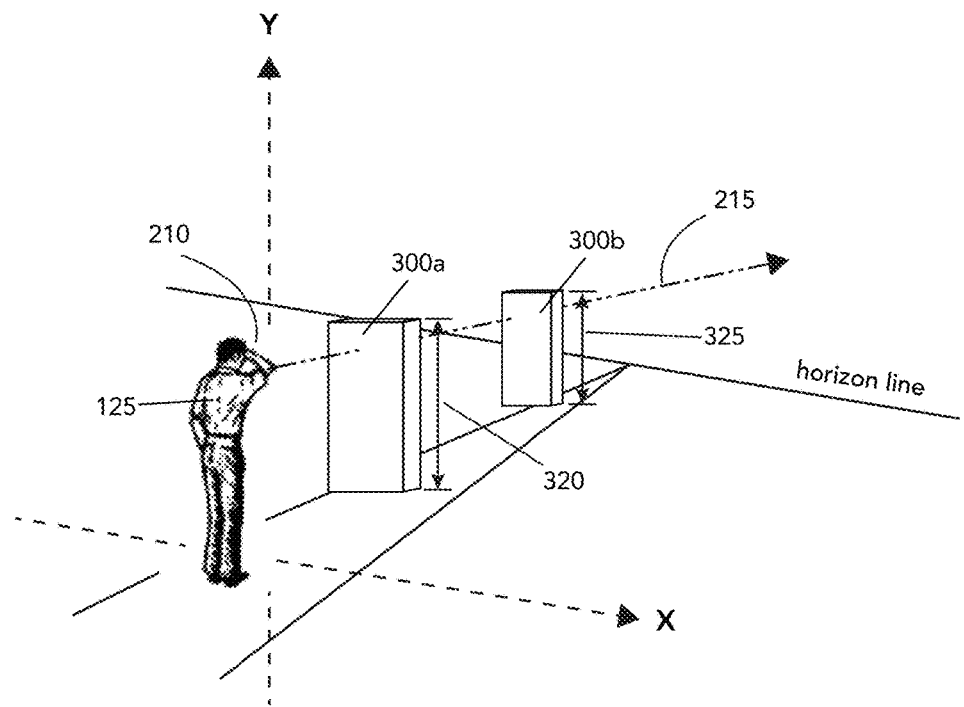
FIG. 3A is a line drawing showing a perspective view of an illustration of distance perspective effect.
Figure 3B:
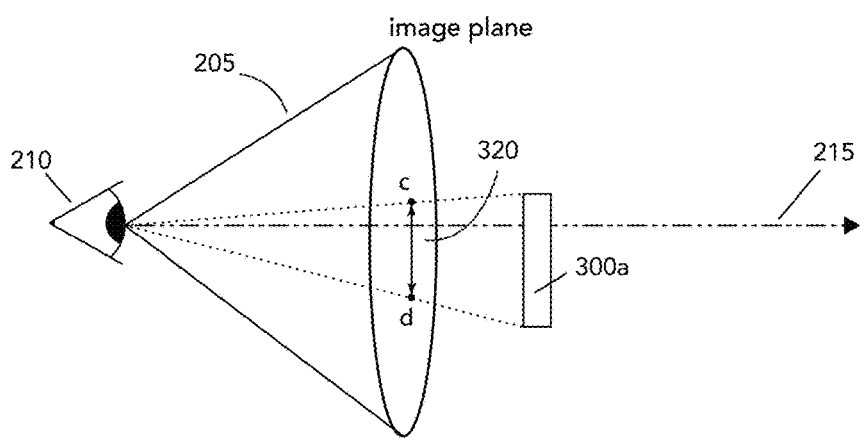
FIGS. 3B&3C are line drawings showing side elevational views of an illustration of distance perspective effect.
Figure 3C:
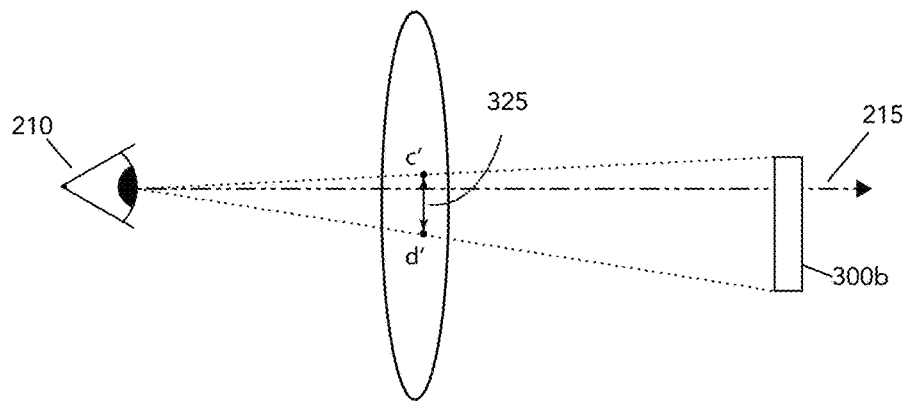

Similarly, FIG. 3 illustrates another perspective distortion relating to an object's distance from the viewer. Object 300 is illustrated at two distances relative to the image plane and viewpoint 210 (first position 300a and second position 300b), but having the same relative orientation with respect to the direction of view 215. As may be seen, first position 300a is closer to the image plane and second position 300b is farther away. As illustrated in FIG. 3B, rays from the top and bottom edges of object 300 pass through the image plane at points "c" and "d" for object 300 at position 300a and "c'"

and "d'" for object 300b. Points c and d define a length dimension 320 in the image plane, whereas points c' and d' define a length dimension 325 in the image plane. As may be seen, image dimension 325 (the apparent length of 300 located at position 300b) is shorter than image dimension 320 (the apparent length of 300 located at position 300a), even though the object depicted in the image is the same physical object (i.e., object 300).

In the systems and methods described herein, these and other exemplary perspective distortions are countered in order to render image-based measurements that are accurate and precise. In one or more embodiments described herein, perspective distortions are countered by using a reference standard piece in an image of an object combined with a novel scaling routine in order to define an accurate and precise scale factor to correlate apparent dimensions measured in an image with actual or physical dimensions.

Figure 4:
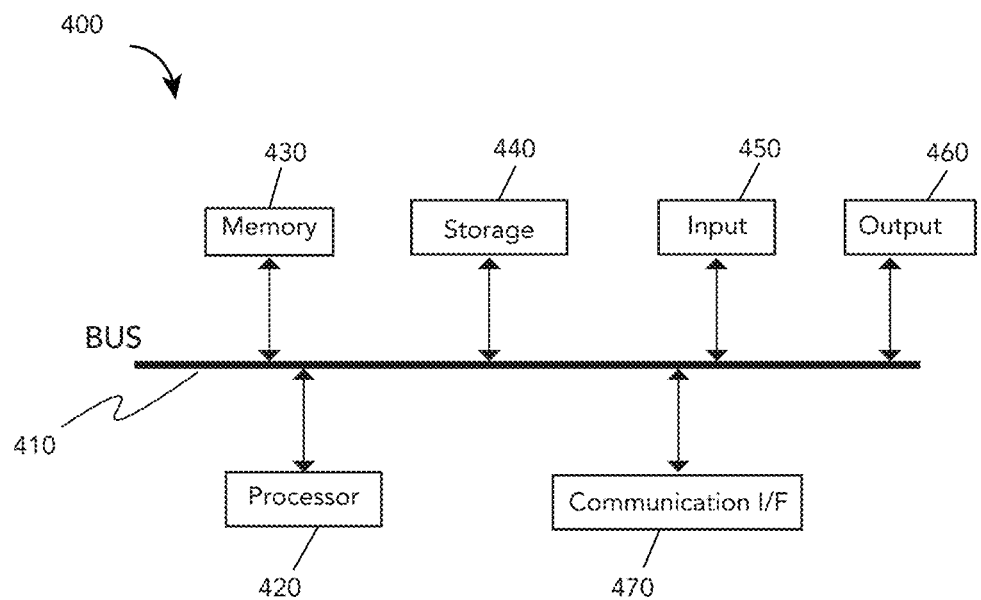
FIG. 4 shows a block diagram illustrating an exemplary device in which various embodiments or portions of embodiments of the present disclosure may be implemented.

Systems and methods described herein may be performed on or by one or more user devices, alone or in combination with one or more other processing devices and/or systems. Generally, user devices/processing devices may be any suitable machines sufficient to run one or more aspects of the image-based measurement system described herein and provide the functionality described herein. FIG. 4 is a block diagram showing a logical arrangement of certain components for an exemplary user device/processing device 400 which may be employed to practice embodiments or portions of embodiments of the present disclosure. Bus 410 ties system components including memory 430 (e.g., ROM and/or RAM) to processor 420. Bus 410 may generally be any suitable type of bus structure using any suitable bus architecture, such as for example, a memory bus or controller, a peripheral bus, or a local bus. In some embodiments, bus 410 may include specialized architectures such as shared memory for integrated GPU(s) or on-chip interconnects. Information transfer to/from the bus (and components) may be accomplished by any suitable means, such as for example a BIOS stored in ROM 430 or the like. Memory 430 may also include specialized memories such as local caches and registers. Device 400 may have more than one processor 420 or may comprise a group or cluster of computing devices 400 networked together to provide greater processing capacity. Processor 420 may include any general purpose processor, with or without one or more hardware or software modules stored in storage device 440, configured to control processor 420, as well as any special-purpose processor. Device 400 may include storage 440 (e.g., flash memory, hard disk drive, magnetic or optical disk drive, or the like). Storage 440 may include software, data and/or instructions for performing functions such as controlling processor 420. In general, the non-transitory computer readable storage media provide nonvolatile storage of computer readable instructions, data structures, program modules and data for processing device 400. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 4, device 400 may comprise one or more input device(s) 450 and output device(s) 460. In general, input device 450 may be any number of input means, such as a digital camera or camera sub-system (e.g., e.g., CCD or CMOS-based camera subsystem), microphone for speech, a touch-sensitive screen for gesture or graphical input, a keyboard, mouse, and the like. Also in general, output device 460 may include any number of output means, such as for example a visual monitor (touchscreen, LCD, CRT, etc.), a printer, and the like. Communications interface(s) 470 generally governs and manages the user inputs and system outputs. A person of ordinary skill in the art would know that the basic features described here may be substituted for improved hardware or firmware arrangements as they are developed.

The exemplary device of FIG. 4 is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include CPU, GPU, microprocessor and/or digital signal processor (DSP) hardware, read-only memory (ROM) (e.g., memory 430) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. Device 400 may practice all or part of the recited methods, may be a part of the recited systems, and/or may operate according to instructions in the recited non-transitory computer-readable storage media. Such logical operations may be implemented as modules or components configured to control processor 420 to perform particular functions according to the programming of the module/component.

User devices/processing devices may take any suitable form. For example, in some embodiments, all or portions of the functions described herein may be executed on a mobile device, such as a smart phone (e.g., iPhone®), tablet computer (e.g., Apple iPad®, Samsung Note®), laptop, desktop machine, or on cloud-based service.

Figure 5B:
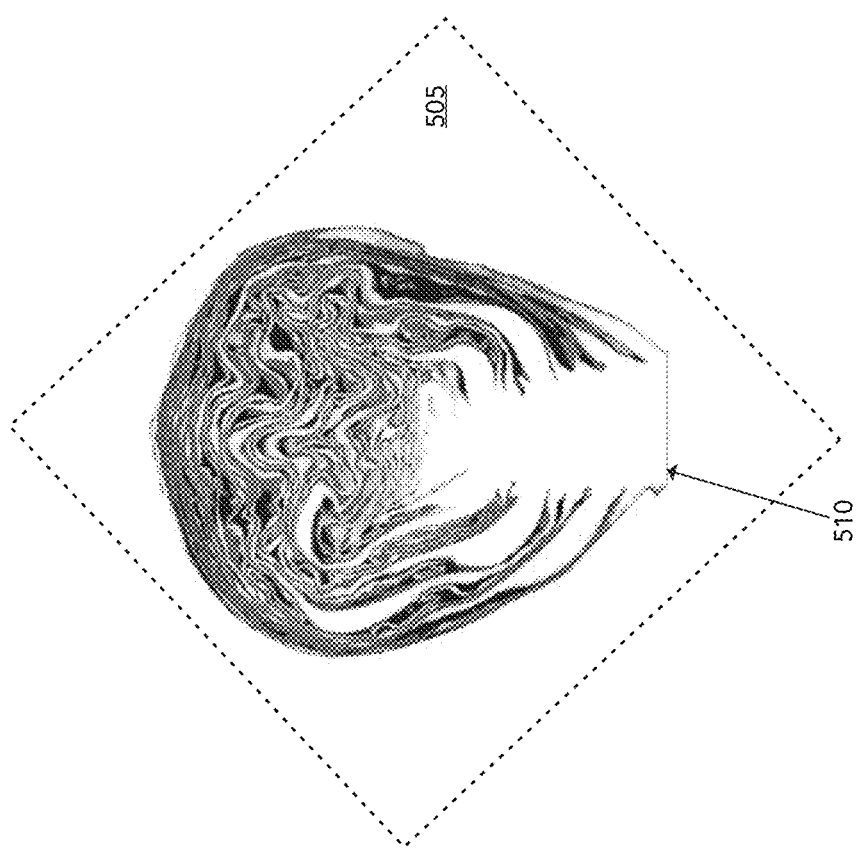
FIGS. 5A&5B are line drawings showing perspective and front elevational views of a halved cabbage head.
Figure 5A:
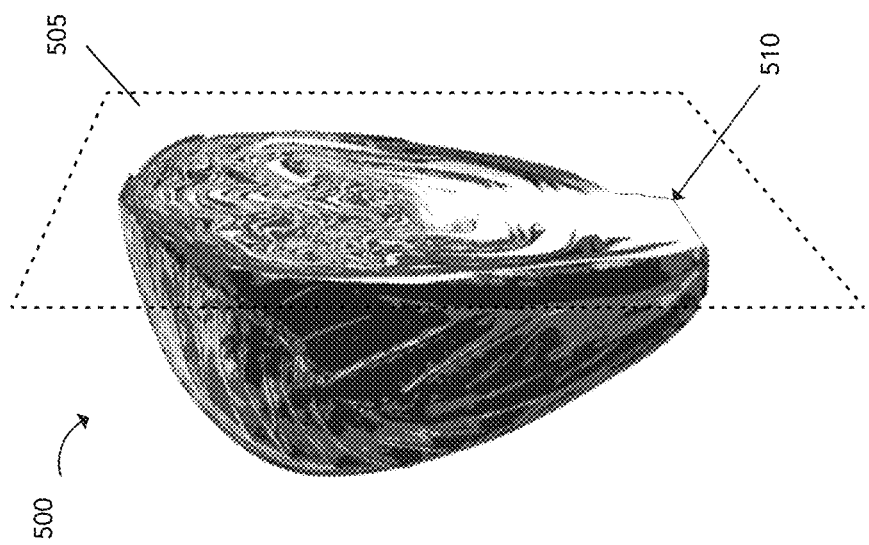

The systems and methods described herein may be utilized to obtain accurate measurement of various dimensions for virtually any object in a digital image. In particular, the systems and methods described herein are useful for obtaining measurements in agricultural applications. For example, they may be used to obtain certain measurements of crops using a digital camera. Unless context suggests otherwise, the exemplary application used in the embodiments described herein is measuring various dimensions of head crops (e.g., lettuce or cabbage), although generally any crop may be measured using one or more of the embodiments described herein. With reference to FIGS. 5A&5B, some embodiments are particularly suitable for obtaining certain measurements of a head crop 500 that has been halved along a plane 505 that is approximately orthogonal to its base 510.

Figure 6:
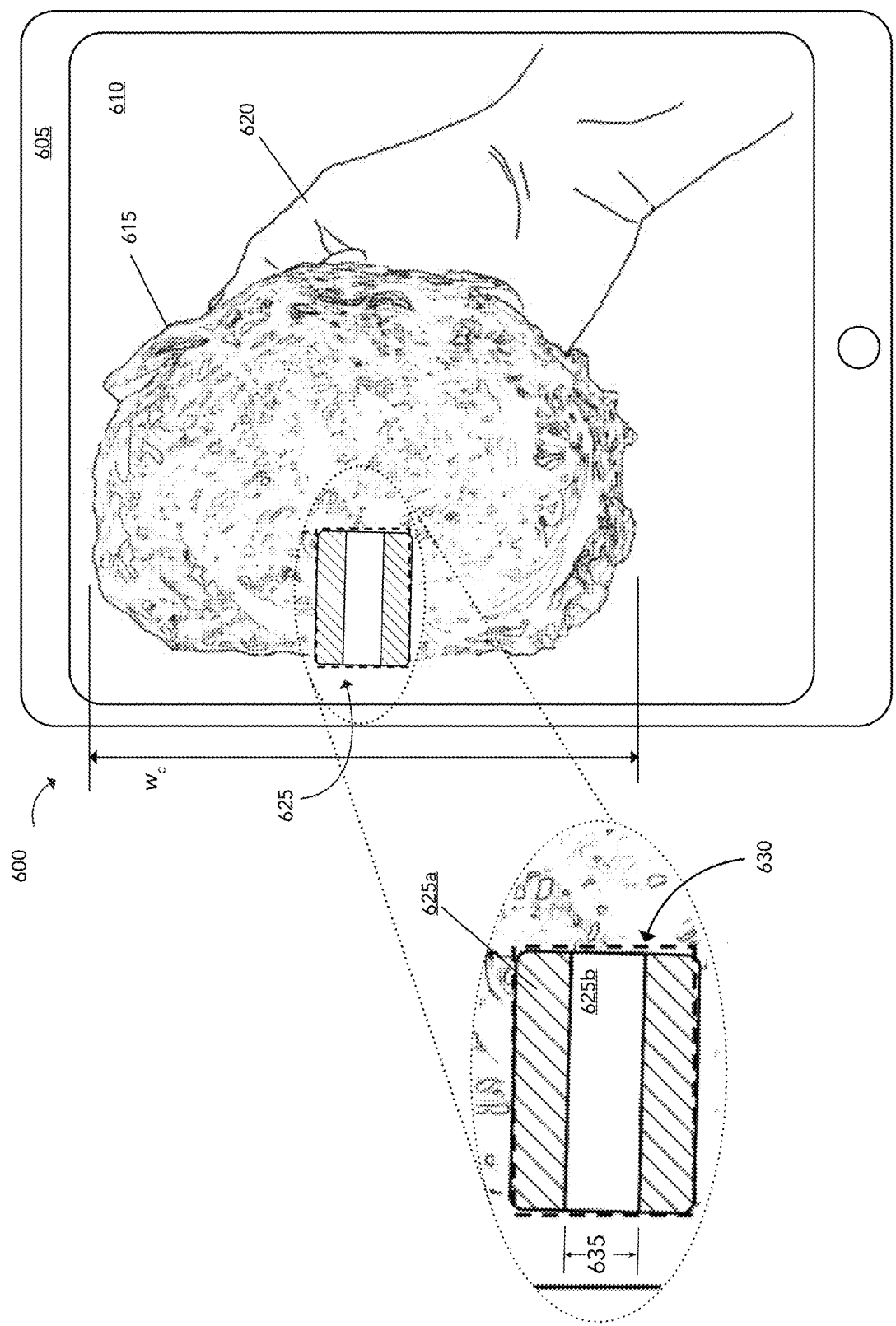
FIG. 6 is a line drawing showing a front elevational view of a device displaying an image of the cabbage of FIGS. 5A&5B together with a reference standard piece, with the reference standard piece zoomed, and a bounding box, according to various embodiments of the present disclosure.

FIG. 6 illustrates one exemplary embodiment of an aspect 600 of a system as described herein. In embodiment 600, device 605 is a tablet or other mobile device capable of displaying and processing image files, and in one or more embodiments is also capable of capturing digital images. As shown, device 605 is displaying image 610 on its touch screen. Image 610 includes digital representations 615, 620, and 625 of a cabbage head that has been halved, a portion of a hand and forearm, and one side of a reference standard as described in some of the embodiments herein, respectively. Such an image may be relevant in applications wherein an agronomist wishes to take measurements of crops in a field, for example. Also shown is a reference standard piece 625. In general, suitable reference standard pieces for use to scale the systems and methods of the present embodiments described herein may be any shape and dimension sufficient to provide the functionality described herein. Preferably, the shape and dimension should be chosen to allow for accurate object detection of the piece as distinct from background and/or other image objects. In one or more preferred embodiments, the shape is a flat, regular polygon (e.g., a flat rectangle). As shown in FIG. 6, reference standard 625 is a flat rectangular piece comprising two distinct regions—a first region 625a and a second region 625b, wherein second region 625b is bounded by first region 625a at least in an upper bound and a lower bound. Note, however, that other embodiments may utilize a reference standard having more than two distinct regions.

In one or more embodiments, the two regions (e.g. 625a and 625b) are differentiated by at least color. In general, in some embodiments, with respect to object detection, at least one of the regions (e.g., first region 625a) may be chosen to sufficiently differentiate the reference standard from image background and/or other objects in the image. For example, in agricultural applications described herein, typical backgrounds will not include orange hues; rather, shades of brown, green, black, etc. will typically be encountered in agricultural fields. In other embodiments, the object detection hardware and/or software utilized is such that color is not needed in order to differentiate the reference standard from background and/or other image objects (e.g., if the object detection is based on geometric properties and/or texture alone). In such embodiments, the only material factor for choosing the color of the first region is its relation to the second region color, as discussed more fully below.

It should be noted that, unless context suggests otherwise, in the exemplary embodiments described herein color and color-values described herein should be considered to be in the RGB color space. A person of ordinary skill in the art will understand how to convert values in other color spaces (e.g., HSV) into RGB color values. Also, a person of ordinary skill in the art, after reviewing this disclosure, should understand how to create pixel tests using images in different color spaces (e.g., HSV) that accomplish the same functions, and thus the disclosure herein supports embodiments using other color spaces. Further, the examples described herein assume a 24-bit RGB color image (8-bits per channel), although other image and color formats (e.g., 32 bit color) may be utilized in embodiments.

Generally, the color difference between regions may be any difference sufficient to provide the scaling functionality described herein. Although more context and detail is described in relation to particular embodiments discussed below, in general the systems and methods described herein utilize color detection to detect upper and lower edges of a region of interest (ROI) (e.g., the second region 625b) of the reference standard in order to arrive at an accurate pixel/dimension ratio. In one or more preferred embodiments, a suitable color for the region of interest is a color selected from grayscale (i.e., in the RGB color space, a color in which the R, G, and B values are equal or approximately equal). In a preferred embodiment, the color is selected to be white or an off-white—i.e., each of the R, G, and B values is equal to or approaching the upper limit value for that channel (e.g., 255 in a 24-bit image). In other preferred embodiments, the color is selected to be black or near-black—i.e., each of the R, G, and B values is equal to or approaching the lower limit value for that channel (e.g., 0).

With continued reference to FIG. 6, in this exemplary embodiment, first region 625a may be configured to have a color that is an orange hue, while second region 625b may be configured to have a color that is a white or near-white.

In general, the larger the reference standard is, the more accurate the pixel/dimension scale should be; however, making the scale too large will normally decrease its ease of use and transportability, and in many cases increasing size results in diminishing returns in light of the application's needed accuracy. In one or more embodiments, the reference standard is sized such that the height 635 of second region 625b is between about 0.125" and 5"; more preferably between about 0.25" and 3"; more preferably between about 0.25" and 1". In an embodiment, the reference standard is sized such that height 635 is approximately 0.5".

As illustrated in FIG. 6, reference standard piece 625 is located in the image such that it is at or near the same distance from the camera (or, alternatively, another relevant image reference point—e.g., camera lens, image sensor, image plane) as the metric of interest (e.g., the cabbage width, $w_c$, in FIG. 6) in the target object (e.g., cabbage 615) and in relatively the same orientation in relation to the direction of view as the plane containing the metric of interest (e.g., here, the plane that is coplanar with the 2-dimensional face of cabbage 615, containing the cabbage width metric, $w_c$, which is the metric of interest for this example), in order to reduce any differential effects from foreshortening and distance between the two objects. In this example, reference standard piece 625 is laid on the surface of the halved cabbage head 615 in order to achieve closeness of relative distance and orientation. In some preferred embodiments, reference standard piece 625 is laid on the surface of the target object in a manner such that the reference standard metric (e.g., height 635) is parallel with the metric of interest (e.g., cabbage width metric, $w_c$) to minimize foreshortening effects. Note that the image shown in FIG. 6 depicts an object (halved cabbage) having a surface that is approximately parallel to the image plane (approximately orthogonal to the direction of view); however, the systems and methods disclosed herein apply to images in which the object and dimension of interest may not be parallel to the image plane. For example, in the image 610 shown in FIG. 6, the halved cabbage head can be held at an angle (e.g., 30 degrees) from the image plane and the scaling systems and methods of the present disclosure will still be sufficient to obtain an accurate scaling factor for measurements.

The systems and methods disclosed herein are configured to identify the reference standard piece in an image and determine relevant boundary pixel coordinates. In some embodiments, object detection software or software components may be configured to recognize the standard reference piece. In such embodiments, all or relevant portions of the boundary of the reference standard piece are located in the image. For example, an object detection routine may place a bounding box around the identified standard reference piece and determine a confidence level that it is the standard reference piece. In other embodiments, the system and methods may provide a user with the ability to manually size and locate an appropriate geometric shape on the display screen of the image so as to cover the reference standard and thereby determine the boundary coordinates in the image of the standard reference piece.

In the embodiment shown in FIG. 6, an object detection bounding box is shown as bounding box 630. As may be seen, bounding box 630 is not located and sized such that it is perfectly coextensive with reference standard piece 625, as indicated by portions of bounding box 630 that lie outside the boundary outline of reference standard piece 625. Accordingly, it is not sufficient in many instances to rely on object detection alone for scaling purposes in image-based measurement applications. Rather, the systems and methods described herein include additional scaling functionality to achieve sufficient accuracy.

Figure 7:
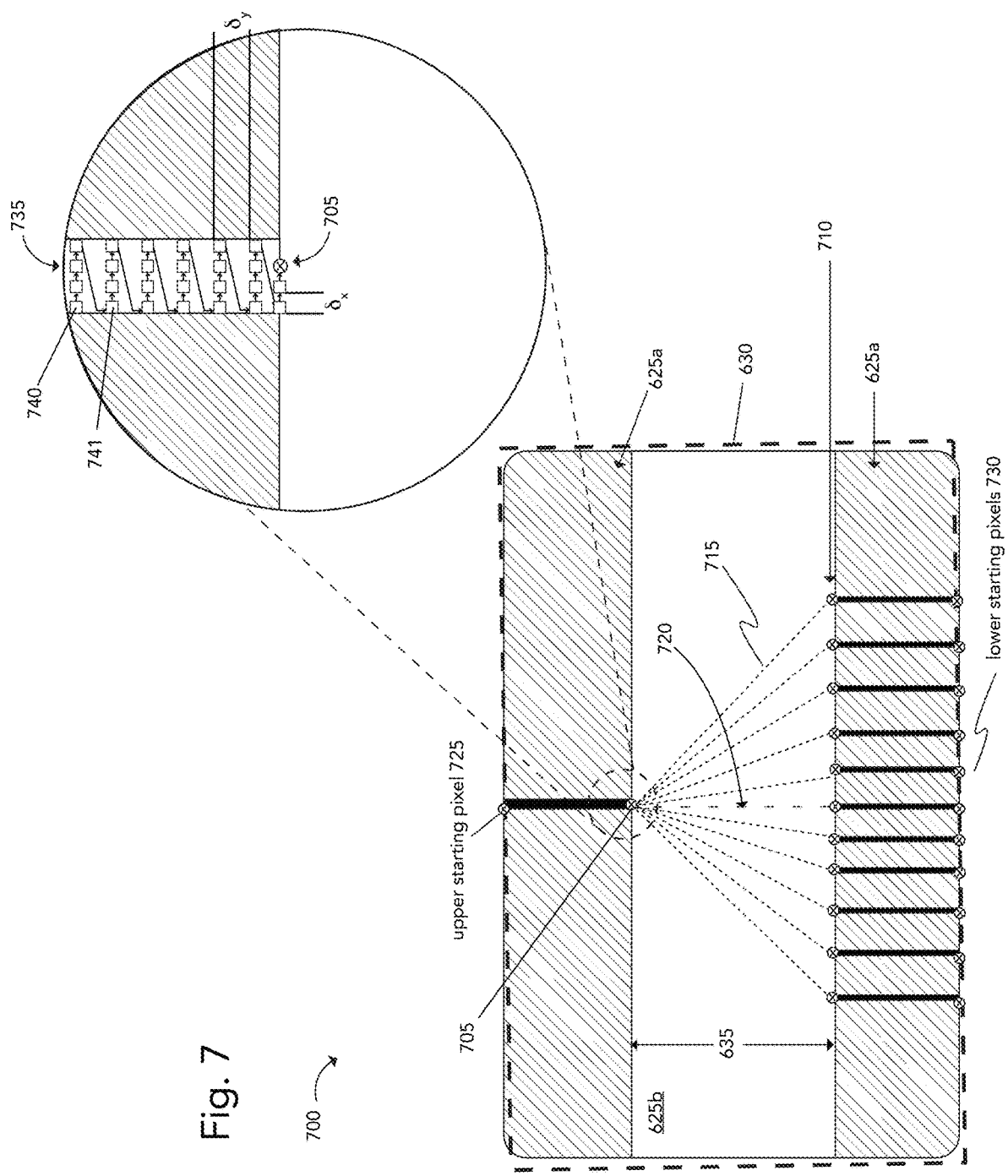
FIG. 7 is a line drawing illustrating a column and row analysis on a reference standard piece, according to various embodiments of the present disclosure.

For example, FIG. 7 illustrates an exemplary embodiment 700 of such additional scaling functionality. In general, the novel scaling method utilized herein locates a first pixel 705 on one side of a region of interest (e.g., second region 625b) and a set of second pixels 710 on the opposing side of the region of interest and determines the shortest distance 720 (measured in pixel count) from the set of calculated distances 715 between the first pixel and second pixels, and uses this pixel count together with the pre-determined length of the region of interest to calculate the pixel/length scaling ratio for the image in question.

In particular, in some embodiments, and with respect to FIG. 7, once the reference standard piece 625 is identified and approximate boundary pixel coordinates of the piece determined (as in, for example, locating a bounding box 630 around the piece), an upper starting pixel 725 is determined and a set 730 of lower starting pixels is determined. In one or more embodiments, a "column" process 735 is initiated at each starting pixel, wherein a pre-determined number of pixels 740 are sampled at pre-determined increments along a "row" axis (e.g., along the x-axis, rows in the image pixel array) and tested to determine whether the row contains pixels of a pre-determined character indicative of the region of interest (e.g., the color, white, of second region 625b). Note that, in the embodiments illustrated in FIG. 7, bounding box 630 is axis-aligned (image axis) and upper starting pixel 725 is located proximate the top of the reference standard piece 625 (at a larger y coordinate than the lower starting pixels, using the image axis convention previously described) and the column process works downward on the y-axis, while lower starting pixels 730 are located proximate the bottom of the reference standard 625 (at smaller y coordinates than that of the upper starting pixel, using the image axis convention previously described) and the column process for them works upward on the y-axis. Other embodiments may use bounding boxes or other polygons that are not image axis-aligned, however, and in such embodiments the object axes used for image analysis are considered to rotate around the image z-axis accordingly and the labels "upper" and "lower" as used herein simply denote opposing sides of the reference standard piece along an object analysis axis that is orthogonal to the base of the piece. In such embodiments, a "row" may be considered to be the set of pixels parallel to the base of the piece. Also, in certain embodiments, upper starting pixel 705 may be considered to be on the opposing side of the region of interest as that shown in FIG. 7 (likewise with the lower starting pixels), in which case the column process associated with the upper starting point samples its way upward and the column process for the lower starting pixels samples its way downward—in any case the column process samples toward the region of interest, regardless of the label of the starting pixels or object axes, as used herein.

Continuing with reference to FIG. 7, in general, the starting pixels may be determined by any method sufficient to provide the functionality described herein. In certain embodiments, at least one starting pixel is determined using boundary pixel coordinates for the reference standard piece. In some embodiments, boundary pixel coordinates are determined via object detection by the system after identifying the reference standard piece in the image. In other embodiments, boundary pixel coordinates are determined by a user placing a user interface element (e.g. a box) over the image location for the reference standard piece as displayed on the user's screen. In certain embodiments, object detection returns a bounding box that specifies approximate pixel coordinates of the boundary for reference standard piece 625, and the at least one starting pixel is selected from the bounding box pixel coordinates. For example, in one or more embodiments, the upper starting pixel 725 may be selected to be the pixel located at the midpoint or in proximity to the midpoint of the bounding box upper edge (as illustrated in FIG. 7). In some exemplary embodiments, the set of lower starting pixels 730 may be determined by selecting one or more pixels from the bounding box pixel coordinates for the lower edge (as illustrated in FIG. 7). For example, in some embodiments, a first lower starting pixel may be selected to be a pixel located in a first or second half of the bounding box lower edge; in some embodiment a third; in some embodiments a quarter. In some embodiments, the remaining set of lower starting pixels may be a predetermined number of starting pixels selected using a fixed or variable pixel distance away from the preceding starting pixel along the bounding box edge, or along the row of the image array.

Continuing with reference to FIG. 7, in general, the column sampling and testing process may be accomplished by any means sufficient to provide the functionality described herein. In one or more embodiments, starting with the relevant starting pixel for that column, the system evaluates the pixel according to one or more test metrics and moves to the next scheduled pixel in the row until a predetermined row pixel limit has been reached or until a predefined number of pixels in the row have passed the test metric, indicating that the boundary of the region of interest has been reached. The system stores a pixel coordinate indicative of the boundary for the region of interest, as indicated by the pixelwise testing, and moves to the next starting pixel for column evaluation.

In general, the pixel test may be any measure sufficient to provide an indicator that differentiates the region of interest from the region containing the column. In one or more embodiments, the pixel test may include metrics comprising pixel intensity (grayscale) metrics, color (e.g., RGB intensities) metrics, and/or outlier analysis. In a preferred embodiment, pixels are evaluated based on color thresholding designed to indicate closeness to grayscale and/or white or black. For example, with respect to FIG. 7, in which first region 625a may be orange (in an embodiment) and second region 625b may be white (in an embodiment), a suitable column pixel test may comprise the following:

$$\text{whiteDetection} \leq \text{whiteThreshold, where}$$
$$\text{whiteDetection} = \text{abs(red-green)} + \text{abs(red-blue)} + \text{abs(green-blue)} \quad (1)$$

In general, the bigger the whiteDetection value is, the further from grayscale (e.g. white) the pixel will be since the RGB component values are equal for grayscale (e.g., white values are 255, 255, 255 in a 24-bit image). The threshold value may be set based upon the context of the application and imaging device, among other factors. For example, in some embodiments, a threshold value of between 100 and 200 may sufficient; in others between 125 and 175; in others, between 140 and 160. In one preferred embodiment, for images of crops in a field environment generated using an iPhone® 11 Pro Max, a threshold value of 150 may be sufficient.

With reference to FIG. 7, column sampling and testing begins at a starting pixel (e.g., upper starting pixel 725) and tests the pixel according to the preconfigured pixel test. Unless loop conditions for the row have been satisfied, the process moves to the next pixel in the row (e.g., row 740) scheduled for testing. In one or more embodiments, the process moves to the pixel having the next sequential row coordinate; in some embodiments, a preconfigured number of pixels $\delta_x$ may be skipped between sampled pixels. If the last scheduled pixel in the row has been reached (e.g., if a preconfigured number of pixels have been tested in the row), the process moves to the next scheduled row (e.g. row 741) closer to the region of interest (e.g., second region 625b). In one or more embodiments, the process moves to the next sequential row, starting at the pixel adjacent the first pixel in the prior row; in some embodiments, a preconfigured number of rows $\delta_y$ may be skipped between sampled rows.

In general, the column boundary test may be any measure sufficient to provide a reliable and accurate indication that the boundary of the region of interest has been reached. In one or more embodiments, the column pixel test may include a determination that a threshold number of pixel tests in a row have satisfied the pixel test criteria. In one exemplary embodiment, a column boundary test is satisfied when the number of pixels in the same row that satisfy the pixel test criteria is between 2 and 50; in some embodiments between 3 and 25; in some embodiments between 3 and 10; in one embodiment 7.

When a row satisfies the column boundary test, the system stores a pixel coordinate from that row as the boundary pixel for that column (e.g., pixels 705, 710 in FIG. 7). In one or more embodiments, the process stores the coordinates for the last pixel tested when the column boundary test is satisfied as the boundary pixel for that column. For example, with reference to FIG. 7, the process stores the current pixel coordinate as first pixel 705 or one of a set of second pixels 710, depending on whether the column in question is starting from an upper starting pixel 725 or lower starting pixel 730.

Generally, when the first pixel and second set of pixels have been determined, the system calculates the linear distance between the first pixel and each of the second set of pixels. For example, with reference to FIG. 7, for each of the pixel combinations (pixel 705, pixel 710i) the system determines the linear distance 715i. Next, from the set of linear distances (e.g., set 715i), the system determines the shortest linear distance (e.g., distance 720) and determines the number of pixels between the first and second pixels along the line 720 and use this value as the pixel count, $p_d$, for use in determining the pixel scaling ratio given by the following:

$$\text{scale} = p_d / h_r \quad (2)$$

where $h_r$ is the physical length of the region used for scaling, such as the height of the region of interest of the scaling reference piece (e.g., length 635 in FIGS. 6 & 7). In one or more exemplary embodiments, the height 635 of second region 625b is between about 0.125" and 5"; more preferably between about 0.25" and 3"; more preferably between about 0.25" and 1". In an embodiment, height 635 is approximately 0.5". In one exemplary embodiment, using an iPhone® 11 Pro Max typically results in a pixel scaling ratio of about 150 pixels/0.5 inches, which is suitable for use in the applications described herein.

The pixel scaling ratio may be utilized in various image-based measurement applications, including agriculture applications. In some exemplary embodiments, the pixel scaling ratio may be used in image analysis applications that measures, e.g., the width, radius, area, circumference, length, and/or height of one or more crops. In some preferred embodiments, the crop is a head crop (e.g., cabbage, lettuce) that has been halved.

Figure 8:
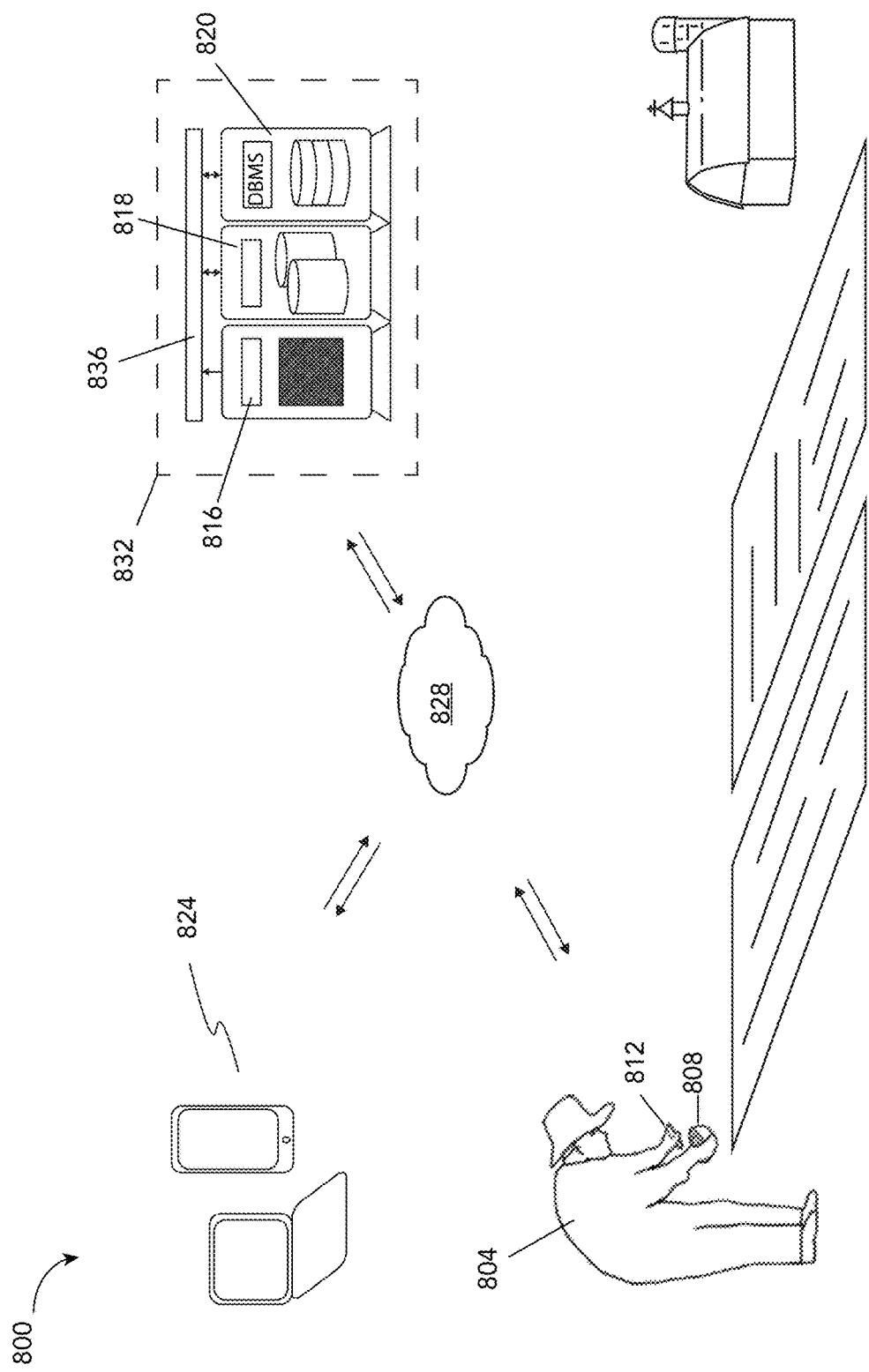
FIG. 8 is an illustration of an application environment according to various embodiments of the present disclosure.

FIG. 8 illustrates an exemplary agronomic system and environment 800 utilizing one or more image-based measurement systems of the present embodiments. As shown, one or more users 804 may capture an image (not shown) of a crop 808. In one or more embodiments, crop 808 may be a head crop that has been cut in half approximately along a plane that bisects the base and tip. In one or more embodiments, the user places a reference standard piece as described herein (e.g., piece 625) on the face of the crop 808 and captures an image of the crop and piece using a user device 812 equipped with a camera (e.g., an iPhone).

With continuing reference to FIG. 8, system and environment 800 may include one or more application servers 816, one or more application storages 818, and one or more application databases 820. In addition, system 800 may include one or more client processing devices 824. In one or more embodiments, user device 812, client device(s) 824, application server(s) 816, storage 818, and database(s) 820 are in data communication via one or more network(s) 828. Network(s) 828 may be the internet, intranets, extranets, local area networks (LANs), wide area networks (WANs), wired networks, wireless network (using wireless protocols and technologies such as, e.g., Wifi), or any other network suitable for providing data communications between two machines, environments, devices, networks, etc. In one or more embodiments, application server 816, storage 818 and/or database 820 may be implemented on networked dedicated host machines; in other embodiments, application 816 and/or database 820 may be hosted as services in one or more service provider environments 832. In general, a service provider environment, such as service provider environment 832, may comprise cloud infrastructure, platform, and/or software providing the various servers, databases, data stores, and the like, sufficient to execute the systems and methods described herein. A person of ordinary skill in the art, reading this disclosure, would understand how to sufficiently configure various additional components and layers (e.g. web servers, load balancers, secure sign-on, etc.) that may be involved in a networked/internet application/system such as the embodiment described in FIG. 8.

Application server 816, storage 818, and database 820 may host one or more agronomic applications 836. In general, agronomic application 836 may be one or more client/server applications or web applications that may be accessed via one or more clients (e.g. in the case of a web application, one or more browsers), such as clients running on one or more client devices 824. Note that in some embodiment user device 812 may comprise a client device 824.

Agronomic application 836 may comprise an application deployed on service environment 832 that performs one or more agronomic related services. For example, agronomic application may comprise a field management or crop breeding application. Agronomic application 836 (which itself may comprise one or more components, applications or modules) may provide certain basic front and backend functionality for users (such as agronomist, breeder, or farmer users using client devices 824) to, e.g., search, store, and analyze agronomic related information. Base application 836 may provide functionality such as, e.g., storing and retrieving agronomic content, generating content pages, rendering, building and managing farm or harvest requisitions and orders, interfacing to other backend systems (e.g., financial and accounting systems, etc.) and other components or sub-systems (e.g., search), workflow, event messaging, commercial documentations, etc. Base application 836 may be supported by one or more application databases

820. Database 820 may be any database sufficient to support the functionality of system 800, such as for example a relational database and/or a document-oriented database. In one exemplary embodiment, system 800 utilizes a MySQL® database and/or a MongoDB® database.

Storage 818 may be any suitable storage for efficiently allowing file intake, storage, and access; for example, storage 818 may be simple web-based object storage comprising one or more logical units of storage (e.g., buckets), such as an application data store and/or image upload data store. Image upload data store 818 may comprise one or more logical units of storage configured to receive image files and/or image analysis files from one or more user devices 824. In one embodiment, an agronomist user client 812 may connect to an sFTP server (not shown) and upload one or more image files and/or one or more image analysis files to the sFTP server, and synching logic (not shown) may thereafter execute to move the uploaded file(s) into image data store 818. In another embodiment, a user may utilize a user portal (not shown) to connect to system 800 and supply one or more image or image analysis files, which are thereafter moved to image data store 818. In one exemplary embodiment, storage 818 is Amazon® S3 object storage or IBM® cloud object storage.

In one or more embodiments, the image-based measurements and analysis disclosed herein may be performed by code executing on client device 812. For example, client 812 may have a standalone application (e.g., a Swift® app for iPhone) that, when executed on device 812, analyzes one or more images stored on device 812. Additionally, such standalone application may be configured to generate one or more files (e.g., .txt or .csv files) that contain image analysis information and optionally image metadata. Such files and/or information may be uploaded to application 836 for search and archival purposes, among others. In other embodiments, the image-based measurements and analysis disclosed herein may be performed by code executing in environment 832 (such as, e.g., in application 836) on one or more images uploaded to application 836.

Turning now to FIG. 9, shown is a flowchart that provides one example 900 of the operation of a portion of one or more embodiments of an image-based measurement system disclosed herein. Note that the flowchart of FIG. 9 shows just an example of the different types of functional arrangements that may be employed to implement the operation of that system as described herein. Alternatively, the flowchart shown in FIG. 9 may be viewed as showing one example of steps of a method for obtaining image-based measurements, under the control of one or more sub-systems configured with executable instructions, according to one or more embodiments.

Note that although functional operations in the Figures herein, including FIGS. 9-10, are depicted in a particular order, the methods described herein are not necessarily limited to the particular order illustrated. A person of ordinary skill in the art may appreciate that all or a subset of the operations shown in the Figures herein, including FIGS. 9-10, may be rearranged, changed, performed in different order (e.g., in parallel, in reverse order) combined, or omitted altogether without departing from the scope of the present disclosure or the spirit of the novel embodiments described herein. In addition, the functional steps depicted herein are intended to provide an understanding of the method to a person of ordinary skill in the art, rather than specifying an actual sequence of code execution, which may be implemented as different sequences or flows or modified in various ways to, e.g., optimize performance or functionality. In particular, any function calls or sequences of such calls described herein are intended to provide an understanding of the methods to a person of ordinary skill in the art, rather than specify actual call format or sequence, which may be implemented as different calls or sequence of calls or modified in various ways to, e.g., optimize performance or functionality.

Continuing with FIG. 9, at step 904 an image is obtained of a target object (e.g., a crop) having at least one metric of interest and a reference standard piece, in which the reference standard piece has approximately the same distance from the camera (or, alternatively, another relevant image reference point—e.g., camera lens, image sensor, image plane) as the metric of interest and has approximately the same orientation in relation to the direction of view as the plane containing the metric of interest. In some embodiments, the metric of interest may be one or more of the width, radius, area, circumference, length, or height of the target object. In some embodiments, the target object may be a crop; in some a head crop that has been approximately bisected from base to tip; in some, a cabbage or lettuce head that has been approximately bisected from base to tip. In one or more embodiments, the reference standard piece may be placed on or in-plane with the target object. In one or more embodiments, the target object may be a head crop that has been approximately bisected along a plane that approximately bisects the head from base to tip, and the reference standard piece has been placed on the flat surface of the bisected head crop.

At step 908, the system identifies the reference standard piece. In some embodiments, the reference standard piece may be as previously described in relation to FIGS. 6 & 7, or as subsequently described in relation to FIGS. 11A&11B. The reference standard piece may be identified by any suitable means. In one or more embodiments, the system utilizes one or more object detection models to determine the approximate boundary of the reference standard piece, while in others the system may provide a user interface tool that allows a user to manually locate and demarcate the boundary of the reference standard piece on a user interface (e.g., touchscreen), as previously described in relation to FIGS. 6 & 7.

In general, in some embodiments, with respect to object detection, at least one region of the reference standard piece (e.g., first region 625*a*) may be chosen to sufficiently differentiate the reference standard from image background and/or other objects in the image. For example, color and/or texture or geometry that sufficiently differentiates the reference standard piece from background may be utilized. In some embodiments, the color utilized may be orange.

Figure 11A:
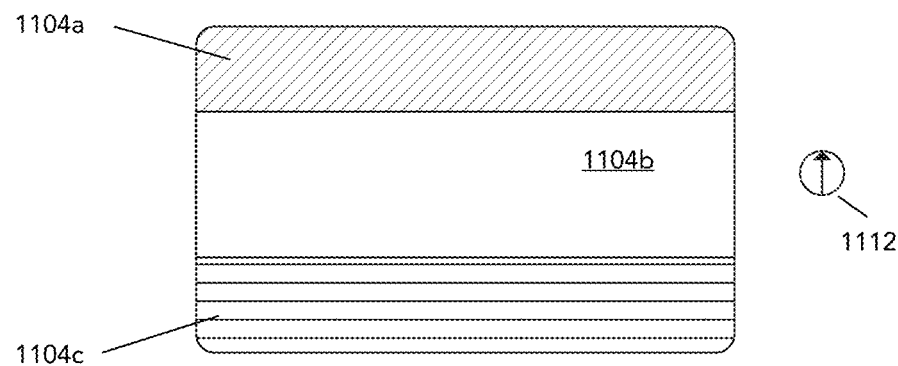
FIGS. 11A&11B are line drawings showing front elevational views of various alternative reference standard pieces according to various embodiments of the present disclosure.
Figure 11B:
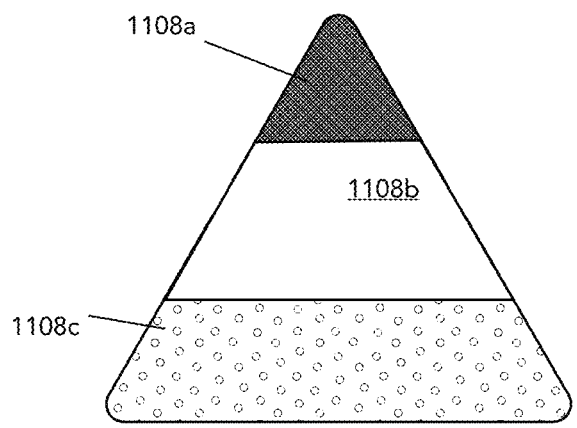

In one or more embodiments, the reference standard piece may have a second region bounded by the first region (or, alternatively bounded on one side by the first region and a second side by a third, different region, as illustrated in FIGS. 11A&11B). Generally, the difference between the regions may be any difference that will sufficiently provide a distinction such that the system may differentiate pixels from one region to another. In some embodiments, the regions may differ by color, where the scaling region of interest (e.g., the second region 625*b*) may be a grayscale (e.g., white or black), while the other region(s) (e.g., first region 625*a*) may be sufficiently different from grayscale to provide accurate and repeatable testing criteria for pixel differentiation based on color comparison. In other embodiments, texture differences of regions may be utilized. Some exemplary embodiments of the reference standard piece are shown in FIGS. 6 & 7 and FIGS. 11 A&11B. In general, the larger the reference standard is, the more accurate the pixel/dimension scale may be; however, making the scale too large will normally decrease its ease of use and transportability, and in many cases increasing size results in diminishing returns in light of the application's needed accuracy. In one or more embodiments, the reference standard may be sized such that the height (e.g., height 635) of the region of interest (e.g., second region 625b in piece 625) is between about 0.125" and 5"; more preferably between about 0.25" and 3"; more preferably between about 0.25" and 1". In an embodiment, the reference standard is sized such that height 635 is approximately 0.5".

Upper Column

At step 912, the system determines the starting pixel coordinate (x,y) for the upper column. In one or more embodiments, the upper starting pixel (e.g. pixel 725) may be selected as a pixel in approximately the center of the upper boundary (e.g., the upper edge of a bounding box located on the reference piece via object detection).

At step 916, the system initiates and executes the upper column loop, as previously described in relation to FIG. 7.

At step 920, the system initiates and executes the row sub-loops, as previously described in relation to FIG. 7.

At step 924, the system determines if the column loop condition has been satisfied in order to locate the upper edge of the region of interest (e.g. second region 625b), as previously described in relation to FIG. 7.

If so, at step 928 the system exits out of the row and column loops and stores a relevant pixel coordinate to demarcate the boundary of the region of interest (e.g., the last pixel tested), referred to herein as the first pixel, as previously described.

If not, at step 932 the system continues to the next row for pixel testing or until an error condition is met (e.g., if a predetermined max number of rows have been tested or watchdog timeout has been reached), as previously described.

Lower Columns

At step 936, the system determines the starting pixel coordinates (xi, yi) for the lower starting pixels, as previously described in relation to FIG. 7. Note that in some embodiments, steps herein may be executed consecutively in traditional control flow (e.g., on a CPU) manner (e.g., on a CPU); in others embodiments, upper and lower columns may be executed in parallel (e.g., on GPUs).

At step 940, an outer loop is initiated and executed (in embodiments using traditional control flow execution) to move the starting position after the preceding column has been executed and a pixel value returned, as previously described.

At step 944, the relevant column loop is initiated and executed, moving toward the region of interest (e.g., toward larger y values), as previously described in relation to FIG. 7.

At step 948, the relevant row sub-loop is initiated and executed, testing pixels along rows (e.g., in the x direction), as previously described in relation to FIG. 7.

At step 952, the system determines if a predetermined number of pixels in a row have met the pixel differentiation criteria, as previously described in relation to FIG. 7.

If so, at step 956 the system exits out of the relevant row and column loops and stores a relevant pixel coordinate to demarcate the boundary of the region of interest (e.g., the last pixel tested), referred to herein as a second pixel, as previously described in relation to FIG. 7.

If not, at step 960 the system continues to the next row for pixel testing or until an error condition is met (e.g., if a predetermined max number of rows have been tested or watchdog timeout has been reached), as previously described in relation to FIG. 7.

At step 964, the system determines if the outer loop condition has been satisfied (e.g., if a predetermined number of columns have been evaluated). If so, at step 968 the system exits the outer loop. If not, at step 972 the system initiates and executes the column at the next scheduled lower stating pixel.

Distance Evaluation

At step 976, the system initiates a distance evaluation loop, as previously described in relation to FIG. 7.

At step 980, the system determines the linear pixel distance between the first pixel and each of the second pixels and at step 984 stores each value, as previously described in relation to FIG. 7.

At step 988, the system exits the distance evaluation loop, and at step 992 compares the distances and returns the shortest distance, as previously described in relation to FIG. 7. The system may utilize the number of pixels returned, $p_d$, in its scale calculation as previously described (see, e.g., Equation (2) and related discussion).

Exemplary pseudo-code for a portion of an exemplary scaling method according to one or more embodiments is set forth in Table 1, below.

TABLE 1

```
# upper column
  For loop looping in the y direction (column loop) by one pixel moving
  down the scale piece from the upper starting pixel
  Another for loop in the x direction (row loop) looking at row limit no.
  of pixels (e.g. 10 pixels) in the x axis before moving down one pixel
  in the y
    Getting pixel values at that (x, y) coordinate
    storing the sum of the difference of all the red, green and blue values
    (see, e.g., equation (1))
    checking if whiteDetection is less than a threshold (e.g., 150)
    Incrementing a counter
    Checking if that counter hits a threshold (e.g., 7)
    If so, back out of all of the loops and store that (x,y) coordinate as
    the first pixel
    If not, loop again (next row)
  Back out if error condition met (max. number of rows)
# lower columns
# outer loop added to move starting pixel location (e.g., x coordinate)
after preceding column evaluated; currently 40 locations evaluated
For loop in x direction, starting in left quadrant of lower boundary,
skipping by predetermined number of pixels (e.g., 10 pixels) each time
  For looping in the y direction (column loop) moving up by 1 starting at
  current lower starting pixel
    For loop in the x direction (row loop) looping through row limit no.
    of pixels (e.g. 6 pixels) in the x direction before moving up one
      Getting pixel values at that (x, y) coordinate
      storing the sum of the difference of all the red, green and blue
      values (see, e.g., equation (1))
      checking if whiteDetection is less than a threshold (e.g., 150)
      Incrementing a counter
      Checking if that counter hits a threshold (e.g., 5)
      If so, back out of all of the current row and column loops and
store
      that (x,y) coordinate as a second pixel in a second pixel array
      If not, loop again (next row)
    Back out if error condition met (max number of rows)
  Back out when max number of columns evaluated (e.g. 40)
# distances
  Get first pixel and relevant second pixel
  Calculate linear pixel distance for these two coordinates and store in
  array
  Determine minimum pixel distance
```

TABLE 1-continued scale
   Get minimum pixel distance
   Get predetermined height of region of interest (e.g., 0.5")
   Calculate pixel/distance scale (see equation (2))
   Store pixel distance scale for use in image-based measurements.

Figure 10A:
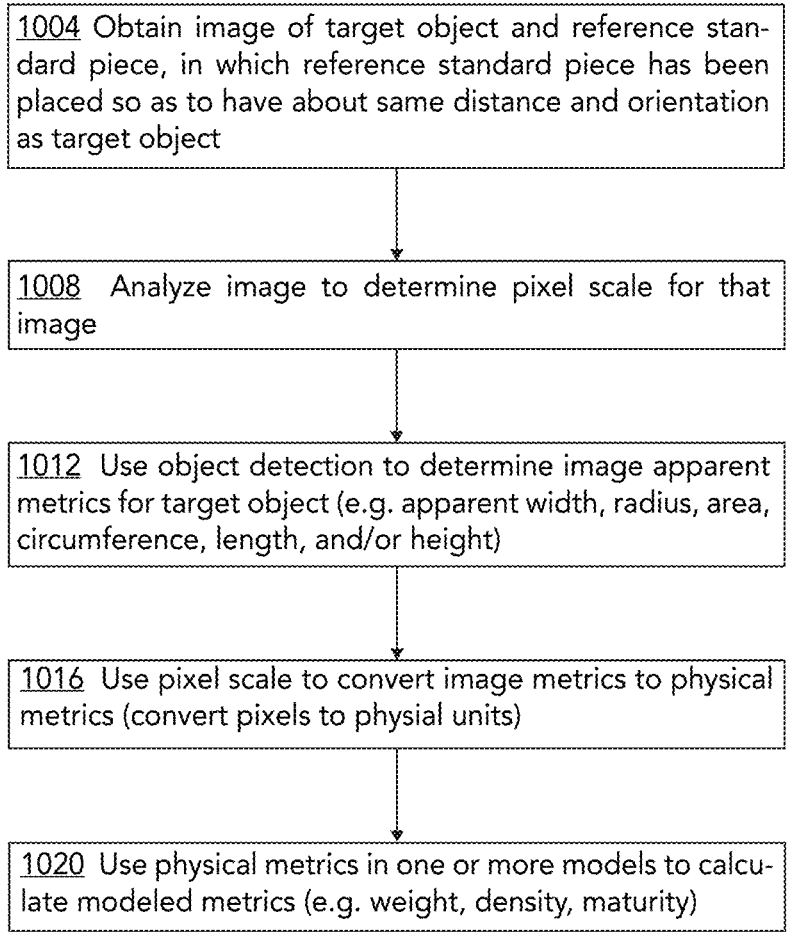
FIGS. 10A & 10B are flowcharts illustrating applications utilizing the pixel scale according to various embodiments of the present disclosure.

With reference to FIG. 10, in one or more embodiments herein, the scaling methods and systems herein may be utilized in connection with an image-based measurement application or applications. In FIG. 10A, at step 1004, an image is obtained of a target object (e.g., a crop) having at least one metric of interest and a reference standard piece, in which the reference standard piece has approximately the same distance from the camera (or, alternatively, another relevant image reference point—e.g., camera lens, image sensor, image plane) as the metric of interest and has approximately the same orientation in relation to the direction of view as the plane containing the metric of interest. In some embodiments, the dimension of interest may be one or more of the width, radius, area, circumference, length, or height of the target object. In some embodiments, the target object may be a crop; in some a head crop that has been approximately bisected from base to tip; in some, a cabbage or lettuce head that has been approximately bisected from base to tip. In one or more embodiments, the reference standard piece may be placed on or in-plane with the target object. In one or more embodiments, the target object may be a head crop that has been approximately bisected along a plane that approximately bisects the head from base to tip, and the reference standard piece has been placed on the flat surface of the bisected head crop.

At step 1008, the image is analyzed to determine the pixel scale using one or more of the systems and methods previously described involving a reference standard piece described herein. In one or more embodiments, object detection returns a bounding box locating the boundary of the reference standard piece in the image. An upper starting pixel and a set of lower starting pixels are determined on opposing sides of the reference standard piece, and column and pixel routines are executed from the starting pixels to determine a first pixel and a set of second pixels demarcating the upper and lower boundaries of a region of interest in the reference standard piece. A set of linear distances (pixel counts) between the first pixel and the second set of pixels is determined and the smallest distance (pixel count) is determined. A pixel scale ratio is calculated for the image by dividing the smallest distance (pixel count) by the preconfigured physical dimension (e.g., height 635, for reference standard 625) stored for the region of interest.

At step 1012, the systems and methods herein utilize object detection to identify an apparent metric or metrics of interest for the target object in the image. In some embodiments, the apparent metric(s) of interest may be one or more of the apparent width, radius, area, circumference, length, or height of the target object.

At step 1016, the systems and methods herein utilize the calculated pixel scale to convert the apparent metrics of interest in the image to physical or actual metrics (e.g., in inches, millimeters, etc.).

At step 1020, the image-based measurement application may utilize the calculated physical metrics in one or more models to obtain one or more derived metrics, such as, e.g., weight, density or maturity of the target object (e.g., head crop).

It should be understood that the foregoing steps may be executed in any suitable environment or any suitable hardware and software systems. For example, in some embodiments, the foregoing steps may be executed in a standalone application on a user device, such as user device 812 in FIG. 8. In other embodiments (e.g., in a distributed application or applications or component-based web application), some of the steps (e.g., steps 1004 through 1016) may be executed on one machine (e.g., user device 812), while other steps (e.g., step 1020) may be executed on another machine (e.g., application server 816 in FIG. 8).

Figure 10B:
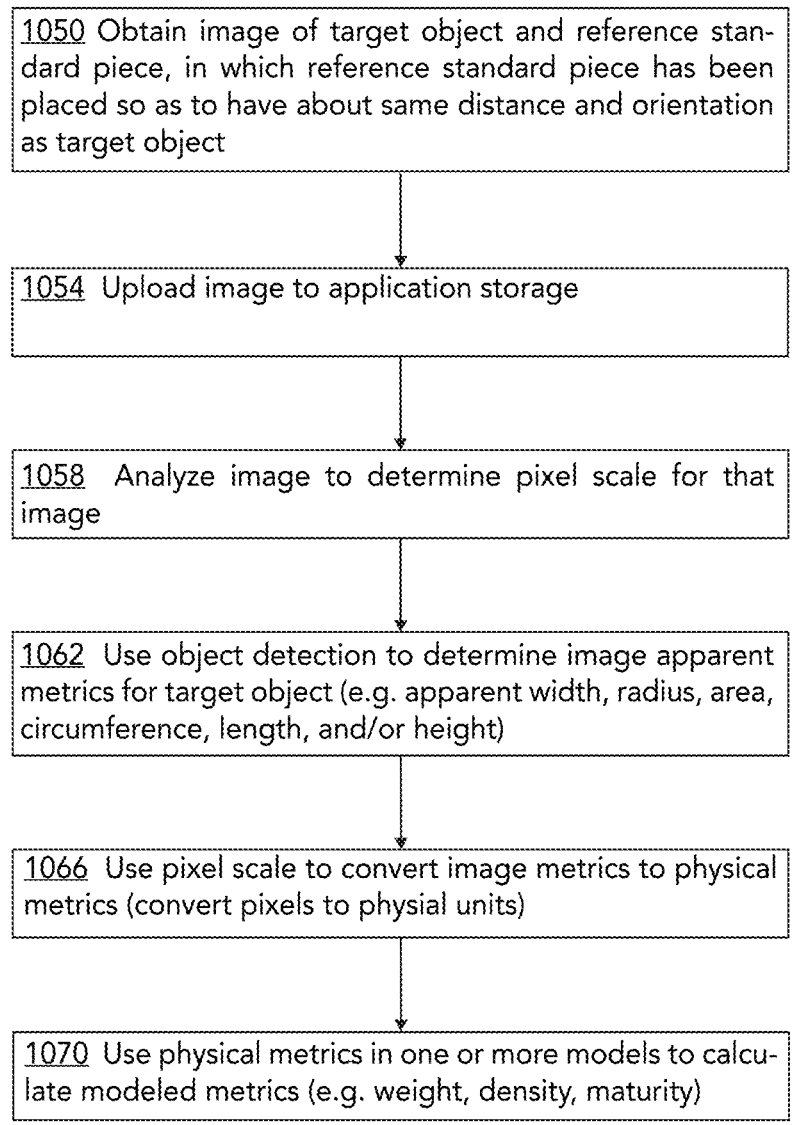

For example, in one or more alternative embodiments herein, and with reference to FIG. 10B, at step 1050, an image is obtained of a target object (e.g., a crop) having at least one metric of interest and a reference standard piece, in which the reference standard piece has approximately the same distance from the camera (or, alternatively, another relevant image reference point—e.g., camera lens, image sensor, image plane) as the metric of interest and has approximately the same orientation in relation to the direction of view as the plane containing the metric of interest. In some embodiments, the dimension of interest may be one or more of the width, radius, area, circumference, length, or height of the target object. In some embodiments, the target object may be a crop; in some a head crop that has been approximately bisected from base to tip; in some, a cabbage or lettuce head that has been approximately bisected from base to tip. In one or more embodiments, the reference standard piece may be placed on or in-plane with the target object. In one or more embodiments, the target object may be a head crop that has been approximately bisected along a plane that approximately bisects the head from base to tip, and the reference standard piece has been placed on the flat surface of the bisected head crop.

At step 1054, a user uploads the image to an application storage (e.g., storage 818).

At step 1058, the uploaded image is analyzed to determine the pixel scale using one or more of the systems and methods previously described involving a reference standard piece described herein. In one or more embodiments, object detection returns a bounding box locating the boundary of the reference standard piece in the image. An upper starting pixel and a set of lower starting pixels are determined on opposing sides of the reference standard piece, and column and pixel routines are executed from the starting pixels to determine a first pixel and a set of second pixels demarcating the upper and lower boundaries of a region of interest in the reference standard piece. A set of linear distances (pixel counts) between the first pixel and the second set of pixels is determined and the smallest distance (pixel count) is determined. A pixel scale ratio is calculated for the image by dividing the smallest distance (pixel count) by the preconfigured physical dimension (e.g., height 635, for reference standard 625) stored for the region of interest. In one or more embodiments, system and environment 800 implements a web application or applications that run code to analyze the image(s) uploaded to application storage 818 to determine the pixel scale for the uploaded image(s).

At step 1062, the systems and methods herein utilize object detection to identify an apparent metric or metrics of interest for the target object in the image. In some embodiments, the apparent metric(s) of interest may be one or more of the apparent width, radius, area, circumference, length, or height of the target object. In one or more embodiments, system and environment 800 implements a web application or applications that run code to analyze the image(s) uploaded to application storage 818 to identify the apparent metric(s).

At step 1066, the systems and methods herein utilize the calculated pixel scale to convert the apparent metrics of interest in the image to physical or actual metrics (e.g., in inches, millimeters, etc.). In one or more embodiments, system and environment 800 implements a web application or applications that run code to convert the apparent metric(s).

At step 1070, the image-based measurement application may utilize the calculated physical metrics in one or more models to obtain one or more derived metrics, such as, e.g., weight, density or maturity of the target object (e.g., head crop). In one or more embodiments, system and environment 800 implements a web application or applications that run code to implement the one or more models to obtain the derived metrics.

Some additional, non-limiting reference standard pieces 1100 that may be utilized in one or more of the embodiments described herein are illustrated with reference to FIGS. 11A&11B.

With reference to FIGS. 11A & 11B, in some embodiments, a reference standard piece 1104, 1108 may have at least a first region 1104a, 1108a, a second region 1104b, 1108b, and a third region 1104c, 1108c, where the second region is a region of interest bounded by the first region 1104a, 1108a on a first side and by the third region of interest 1104c, 1108c on the opposing side. In the embodiment shown in FIG. 11A, reference piece 1104 is a flat rectangular piece, and all three regions differ in at least one aspect (e.g., color, texture) that may be utilized by the systems and methods herein in suitable pixel and column tests. In the embodiment shown in FIG. 11B, reference piece 1108 is a flat triangular piece, and all three regions differ in at least one aspect (e.g., color, texture) that may be utilized by the systems and methods herein in suitable pixel and column tests. As illustrated by direction arrow 1112, using a reference standard piece such as pieces 1104, 1108, in which a region of interest is bounded by regions having at least one differentiating characteristic allow for directionality. Such directionality may be utilized in suitable pixel and/or column tests.

As used herein, computer-executable instructions may include, for example, instructions and data which cause a general purpose computer, special purpose computer, or special purpose processing device to perform a function or group of functions. Computer-executable instructions may also include program modules that are executed by computers in stand-alone or network environments. In general, program modules may include routines, programs, components, data structures, objects, and the functions inherent in the design of special-purpose processors, etc. that perform particular tasks or implement particular abstract data types. Computer-executable instructions, associated data structures, and program modules may represent examples of the program code means for executing steps of the methods disclosed herein. A particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure. We therefore claim as our invention all that comes within the scope of these claims.

I claim:

1. A system for determining a pixel scale of an image comprising:
   a digital image capture device;
   at least one image storage configured to store digital images;
   a reference standard piece having at least one planar surface comprising a first region, a second region, and a third region, wherein the second region is bordered by the first region at its upper boundary and the third region at its lower boundary, wherein the upper and lower boundaries are parallel, wherein the second region has a predetermined height and differs from both the first and third regions by at least one characteristic sufficient to differentiate the second region from both the first and third regions in a pixel test utilizing one or more of a pixel grayscale metric, color metric, and outlier analysis;
   a digital image stored in the at least one image storage that shows a portion of a scene containing at least one target object having at least one physical dimension of interest and the reference standard piece, wherein the reference standard piece is located in the image in a manner indicative of its placement in the scene at or near the same distance from the digital image capture device as the target object and in relatively the same orientation in relation to the direction of view as the plane containing the physical dimension;
   at least one device processor; and
   non-transitory computer-readable storage medium storing instructions that, when executed by the at least one processor, perform a method comprising the steps of,
   identifying the standard reference piece,
   determining the starting pixel coordinates for an upper column,
   executing an upper column loop,
   executing a plurality of upper column row sub-loops using an upper pixel test to determine if a plurality of pixels in any of the upper column rows is better characterized as a second region pixel or a first region pixel,
   determining if an upper column loop condition has been satisfied in order to locate the upper edge of the second region and storing a first relevant pixel coordinate to demarcate the boundary of the second region and the first region when the condition is met,
   determining starting pixel coordinates for a plurality of lower columns,
   executing an outer loop to move the starting position for analyzing each of the plurality of lower columns, executing each of a plurality of lower column loops corresponding to the plurality of lower columns, executing a plurality of lower column row sub-loops for each of the plurality of lower column loops using a lower pixel test to determine if a plurality of pixels in any of the lower column rows is better characterized as a second region pixel or a third region pixel, for each of the plurality of lower column loops, determining if a lower column loop condition has been satisfied in order to locate the lower edge of the second region and storing a set of second relevant pixel coordinates to demarcate the boundary of the second region and the third region when the condition is met, determining the linear distance, in pixel counts, between the first pixel and each of the set of second pixels, determining the smallest pixel count, and calculating the pixel scale using the smallest pixel count and the predetermined height.

2. The system of claim 1, wherein the step of calculating the pixel scale further comprises dividing the smallest pixel count by the predetermined height.

3. The system of claim 2, wherein the first and third regions are orange, the second region is white, and the characteristic is color.

4. The system of claim 2, wherein the reference standard piece is a flat rectangular piece, the second region comprises a band extending along the mid-section of the piece, and wherein the predetermined height of the second region is between about 0.25" and 1".

5. The system of claim 4, wherein the at least one target object is a head crop.

6. The system of claim 5, wherein the head crop is a cabbage or lettuce that has been approximately bisected along a plane extending proximate the base and tip of the head crop.

7. The system of claim 1, wherein the first and third regions have the same dimensions, color, and texture, and wherein the characteristic is the same in relation to both the first and third regions.

8. The system of claim 7, wherein the first and third regions are orange, the second region is white, and the characteristic is color.

9. The system of claim 8, wherein the upper and lower pixel tests comprise a determination whether the sum of the absolute differences between the red and green, red and blue, and green and blue pixel components is less than a threshold amount.

10. The system of claim 9, wherein the upper and lower threshold amounts are the same.

11. The system of claim 10, wherein the upper and lower threshold amounts are each 150.

12. The system of claim 1, wherein the upper and lower pixel tests are the same test.

13. The system of claim 12, wherein the pixel test comprises a determination whether the sum of the absolute differences between the red and green, red and blue, and green and blue pixel components is less than a threshold amount.

14. The system of claim 1, wherein the reference standard piece is a flat rectangular piece, the second region comprises a band extending along the mid-section of the piece, and wherein the predetermined height of the second region is between about 0.25" and 1".

15. The system of claim 1, wherein the at least one target object is a head crop comprising a cabbage or lettuce that has been approximately bisected along a plane extending proximate the base and tip of the head crop.

16. The system of claim 15, wherein the method further comprises the step of calculating at least one derived metric for the at least one target object using the physical dimension, wherein the at least one derived metric is weight, density or maturity of that crop.

17. The system of claim 1, wherein the at least one image storage, the at least one device processor, and the at least one image capture device are sub-systems of one machine.

* * * * *